United States Patent Office 3,037,978
Patented June 5, 1962

3,037,978
SUBSTITUTED ORGANIC PHOSPHINE DERIVATIVES
Harold Coates, Wolbourn, and Peter Albert Theodore Hoye, Ashford, England, assignors to Albright and Wilson (Mfg.) Limited, Oldbury, England
No Drawing. Filed Sept. 19, 1958, Ser. No. 761,932
Claims priority, application Great Britain Sept. 24, 1957
7 Claims. (Cl. 260—247.5)

This invention is for improvements in or relating to a process for producing organic phosphines. A series of organic phosphines and a process for their production has been previously described in our co-pending patent application No. 597,570, filed July 13, 1956, and the present invention is an improvement in or modification of the invention of our said co-pending application.

The process for the preparation of aminomethyl phosphines described in our co-pending application comprises reacting a hydroxy-methylphosphonium salt of the general formula $\overset{+}{X} \cdot P(CH_2OH)_{4-n}R_n$, with a primary or secondary amine of the general formula $R'R''NH$, where $\overset{+}{X}$ is the cation of an acid, $R''$ is an alkyl, aralkyl, aryl or heterocyclic radical or a hydrogen atom, $R$ and $R'$ are alkyl, aralkyl, aryl or heterocyclic radicals, and $n$ is 0, 1 or 2. $R$, $R'$ and $R''$ may be the same or different and where $n=2$ so that there are two R radicals, they may be the same or different. The reaction proceeds according to the equation:

$\to P(CH_2NR'R'')_{3-n}R_n + CH_2O + HX$

We have now found that the series of compounds $P(CH_2NH'R'')_{3-n}R_n$ may be prepared in a very convenient manner by the direct reaction of phosphine or a substituted phosphine with formaldehyde and a primary or secondary amine, with a methylolamine or with a methylenediamine.

According to the present invention, there is provided a process for the production of an organic phosphine of the general formula $P(CH_2NR'R'')_{3-n}R_n$ which comprises reacting a phosphine of the general formula $R_nPH_{3-n}$ with formaldehyde and a primary or secondary amine of the general formula $NHR'R''$, or a methylolamine of formula $HOCH_2NR'R''$ where $R$ and $R'$ are alkyl, cycloalkyl, aralkyl, aryl or heterocyclic radicals and $R''$ is an alkyl, cycloalkyl, aralkyl, aryl or heterocyclic radical or a hydrogen atom, and $n$ is 0, 1 or 2.

The invention also includes a modification of the foregoing process wherein the formaldehyde and primary or secondary amine or the methylolamine are replaced by a methylene diamine of the general formula $CH_2(NR'R'')_2$ in which $R'$ and $R''$ have the above-mentioned significance. $R$, $R'$ and $R''$ may be the same or different and, where $n=2$, the two radicals R may be the same or different.

The reactions may be expressed as follows:

$R_nPH_{3-n} + mR'R''NH + mCH_2O$
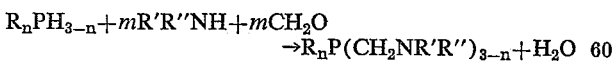

(where $m$ is equal to or greater than $3-n$)

$R_nPH_{3-n} + HOCH_2NR'R'' \to R_nP(CH_2NR'R'')_{3-n} + H_2O$ or $R_nPH_{3-n} + CH_2(NR'R'')_2$
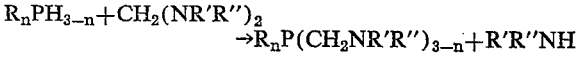

The reaction may be carried out using the phosphine and a methylolamine (hydroxymethylamine) since the formaldehyde and the amine frequently react, sometimes exothermically, on mixing to produce the said methylolamine.

Examples of suitable amines include methylamine, ethylamine, aniline, benzylamine, cyclohexylamine, dimethylamine, diethylamine, ethylaniline, piperidine, morpholine.

Examples of suitable phosphines include phosphine itself, methylphosphine, ethylphosphine, butylphosphine, phenylphosphine, dimethylphosphine, diethylphosphine, dibutylphosphine, dinonylphosphine, diphenylphosphine and the like.

In general, the most convenient method of carrying out the reaction is as follows. The phosphine is added gradually, through a gas distributor if gaseous, to a vigorously stirred solution of the aldehyde (if a primary or secondary amine is used), and the amine, under an inert atmosphere such as nitrogen or carbon dioxide. Water is a very suitable and convenient solvent in which to carry out the reaction but any other inert solvent may be used if desired.

In general, if monomeric products are required, when using mono-substituted amines or their derivatives, care must be taken to avoid too vigorous reaction conditions since any hydrogen atom remaining attached to nitrogen is available for further reaction to give polymeric products.

The following examples serve to illustrate the invention. All parts and percentages are by weight unless otherwise stated.

Example I

Phosphine (4800 parts by volume) was passed gradually with vigorous stirring over a period of 10 hours into a mixture of diethylamine (98 parts) and 37% aqueous formaldehyde (120 parts) in a flask fitted with a powerful agitator, keeping the temperature at 20°–25° C. by water-cooling. Throughout the reaction, an atmosphere of nitrogen was maintained in the reaction vessel.

The product separated from the aqueous layer as a colourless oil and was extracted with benzene (50 parts). The benzene extract was washed with water, dried over anhydrous sodium sulphate and the solvent removed.

Distillation of the residue gave tris-diethylaminomethylphosphine (62 parts), B.P. 121°/2 mm. $n_D^{25}=1.4781$.
*Analysis.*—Found P=10.78%. Calculated

P=10.73%

Example II

Di-n-butylphosphine (8.5 parts) was added with good stirring to a mixture of diethylamine (6.85 parts) and 37% aqueous formaldehyde (13.15 parts) under an atmosphere of nitrogen. Reaction was immediate and exothermic, the temperature rising from 22° C. to 45° C. After stirring for 30 minutes, the colourless upper layer was extracted with petroleum ether (B.P. 40°–60° C.), the extract washed with water, dried over anhydrous sodium sulphate and the solvent distilled off. Distillation of the residue gave diethylaminomethyl-di-n-butylphosphine (13.6 parts), B.P. 107°–108° C./3 mm., $n_D^{18.5}=1.4675$.

Example III

Phenylphosphine (15 parts) was added over a period of one minute to a stirred mixture of diethylamine (30 parts) and 37% aqueous formaldehyde solution (60 parts) under a nitrogen atmosphere. The temperature of the mixture rose from 20° C. to 40° C. After stirring for 15 minutes the colourless upper oily layer was extracted with petroleum ether (B.P. 40°–60° C.) (20 parts), the extract washed with water, dried over anhydrous sodium sulphate and distilled, giving bis-(diethylaminomethyl)-phenylphosphine (29.3 parts), B.P. 104°–106° C./0.05 mm., $n_D^{25}=1.5266$.

Example IV

Tetraethylmethylenediamine (42 parts) was added under nitrogen to phenylphosphine (14.2 parts) in an apparatus fitted for distillation. The mixture was heated at 120° C. for 35 minutes, during which time diethylamine (17.6 parts) (93% of the theoretical amount) distilled off, B.P. 55°–60° C. The pale yellow residue was distilled, giving bis-(diethylaminomethyl)-phenylphosphine (34 parts, 93% yield), B.P. 108° C./0.08 mm. $n_D^{25}=1.5273$.

*Analysis.*—Found P=10.69%, calculated P=11.07%.

The following example shows the use of the product of Example I as an intermediate in a chemical synthesis:

Example V

A mixture of tris-diethylaminomethylphosphine (21.2 parts, 0.073 mole) and ethyl acetoacetate (9.5 parts, 0.073 mole) in a distillation apparatus under nitrogen was heated to approximately 130° C. The theoretical quantity of diethylamine was distilled off in 10 minutes leaving a colourless oil (25 parts) which was believed to consist essentially of

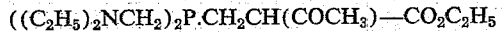

The following example shows the use of an analogous morpholino-compound, prepared in the same manner as is illustrated in Examples I to IV, for the production of a flame-resistant resin:

Example VI

Tris-morpholinomethylphosphine (15.5 parts, 0.045 mole) and hydroquinone (7.75 parts, 0.07 mole) were heated in an oil bath at 190° C. for 45 minutes. A clear solution was obtained after 5 minutes. The morpholine was removed under reduced pressure and the product heated for a further 15 minutes at 190° C. in vacuum (12 mms.).

The product was liquid at 190° C. When cold it was a clear, brittle pale yellow resin which would not burn.

We claim:

1. A process for the production of an organic phosphine of the formula $P(CH_2NR'R'')_{3-n}R_n$ which comprises reacting a phosphine of the formula $R_nPH_{3-n}$ with a methyl amine of the formula $CH_2(NR'R'')Y$ in which formula R is a member selected from the group consisting of hydrogen, monocyclic aryl and lower alkyl, R' is a member selected from the group consisting of cycloalkyl, alkyl, monocyclic aralkyl, monocyclic aryl and, together with N and R'', piperidino and morpholino; R'' is a member selected from the group consisting of hydrogen, alkyl, cycloalkyl, monocyclic aralkyl, monocyclic aryl and, together with N and R', piperidino and morpholino; and Y is a member selected from the group consisting of a hydroxyl group and an amino group of the formula NR'R'' in which R' and R'' are as above defined, $n$ being a whole number from 0 to 2, inclusive.

2. A process according to claim 1 wherein the methylene amine is methylene diamine which is generated in situ by the use of formaldehyde and an amine of the formula NHR'R''.

3. A process according to claim 1 wherein the reaction is effected in an inert solvent.

4. A process according to claim 2 wherein the reaction is effected in an inert solvent.

5. A process according to claim 1 wherein the reaction is effected under an inert atmosphere.

6. A process according to claim 2 wherein the reaction is effected under an inert atmosphere.

7. A process according to claim 1 wherein the phosphine of the formula $R_nPH_{3-n}$ is added gradually to the other reactant in solution in an inert solvent maintained under an inert atmosphere while the solution is vigorously stirred.

References Cited in the file of this patent

UNITED STATES PATENTS

| | | |
|---|---|---|
| 2,160,842 | Dreyfus | Jan. 6, 1939 |
| 2,803,597 | Stiles et al. | Aug. 20, 1957 |

FOREIGN PATENTS

| | | |
|---|---|---|
| 935,611 | France | Feb. 2, 1948 |